(12) United States Patent
Oka et al.

(10) Patent No.: US 6,529,268 B1
(45) Date of Patent: Mar. 4, 2003

(54) BASELINE LENGTH VARIABLE SURFACE GEOMETRY MEASURING APPARATUS AND RANGE FINDER

(75) Inventors: Kiyoshi Oka, Ibaraki-ken (JP); Kenjiro Obara, Ibaraki-ken (JP); Eisuke Tada, Ibaraki-ken (JP); Satoru Takahashi, Akita-Ken (JP)

(73) Assignees: Japan Atomic Energy Research Institute, Tokyo (JP); Lightstep Corporation, Akita-Ken (JP)

( * ) Notice: Subject to any disclaimer, the term of this patent is extended or adjusted under 35 U.S.C. 154(b) by 0 days.

(21) Appl. No.: 09/713,207

(22) Filed: Nov. 16, 2000

(30) Foreign Application Priority Data

Nov. 18, 1999 (JP) .......................................... 11-328176

(51) Int. Cl.[7] .............................. G01C 3/00; G01C 3/08; G01C 5/08
(52) U.S. Cl. .................................................... 356/3.04
(58) Field of Search ................................ 356/3.01–3.09

(56) References Cited

U.S. PATENT DOCUMENTS

| | | | | |
|---|---|---|---|---|
| 4,325,640 A | * | 4/1982 | Dreyfus et al. | 356/376 |
| 4,346,988 A | * | 8/1982 | Kimura et al. | 356/1 |
| 4,627,734 A | * | 12/1986 | Rioux | 356/376 |
| 4,830,485 A | * | 5/1989 | Penney et al. | 356/1 |
| 4,896,343 A | * | 1/1990 | Saunders | 378/95 |
| 4,943,157 A | * | 7/1990 | Reding | 356/1 |
| 4,970,401 A | * | 11/1990 | Sadeh et al. | 250/560 |
| 4,983,043 A | * | 1/1991 | Harding | 356/376 |
| 5,076,690 A | * | 12/1991 | deVos et al. | 356/152 |
| 5,082,362 A | * | 1/1992 | Schneiter | 356/1 |
| 5,596,386 A | * | 1/1997 | Hankawa | 396/110 |
| 5,760,884 A | * | 6/1998 | Yahashi et al. | 356/3.14 |
| 5,774,207 A | * | 6/1998 | Yoshida et al. | 356/3.09 |
| 5,838,428 A | * | 11/1998 | Pipitone et al. | 356/3.09 |
| 6,127,689 A | * | 10/2000 | Pryor et al. | 250/559.29 |

* cited by examiner

Primary Examiner—Thomas H. Tarcza
Assistant Examiner—Brian Andrea
(74) Attorney, Agent, or Firm—Banner & Witcoff, Ltd.

(57) ABSTRACT

A surface geometry measuring apparatus which relies upon triangulation to measure the distance to an object from a sensor head comprising projection optics and observation optics, wherein the projection optics has a drive mechanism capable of adjusting the laser beam projecting position or the baseline length, the distance to the object is calculated by measuring the baseline length at the time when the point at which a spot of the laser light projected to the object forms a focused image on the observation plane in the observation optics has come to the center of the observation plane, the surface geometry measuring apparatus has a mechanism for causing the sensor head or observation optics to move or turn from side to side and a mechanism for causing the sensor head to turn up and down such that the moving or turning from side to side and the turning up and down allow the point of measurement on the object to be scanned with the laser beam two-dimensionally to measure the surface geometry of the object. The apparatus withstands use in extreme environments such as high temperature and high radiation and it can also be used as a range finder.

11 Claims, 9 Drawing Sheets

BASELINE LENGTH VARIABLE SURFACE GEOMETRY MEASURING APPARATUS AND RANGE FINDER

BACKGROUND OF THE INVENTION

This invention relates to an apparatus for measuring the surface geometries of objects by range finding based on triangulation. The invention relates particularly to a range finder which has the sensing part isolated from the controlling and analyzing part so that it can be used in extreme environments. More particularly, the invention relates to a range finder which operates on triangulation.

The prism 21 is fixed on a baseline length adjusting stage 41 which is in turn is mounted on a ball screw 44. If the ball screw 44 is turned with a motor 22 via a coupling 42, the prism 21 moves from side to side along a linear guide 46. The distance from the laser head 40 to the position of light projection from the prism 21 defines the baseline length, which is adjusted by linear movement of the prism 21. The motor 22 is controlled with a motor controller 23 fitted in the controlling and analyzing device 37 through a motor cable 34.

If this conventional range finder is used as a sensing eye on a robot arm (i.e., as a robot vision), it cannot analyze the surface geometries of objects (e.g. a surface geometry for identifying the positions of handling hook holes), making precise handling of the robot arm impossible.

The conventional surface geometry measuring apparatus comes in one of two major types: a device for measuring the distance to a point on the object spotwise is mounted on a device capable of two-dimensional movement 30 (e.g. an XY stage or an XY robot) and the point of measurement is moved two-dimensionally in a consecutive manner to profile the surface geometry of the object; or a device for measuring the surface geometry of the object (such as by a light section method) in a one-dimensional direction is mounted on a device (such as a linear stage or a direct-acting robot) capable of translation in the other one-dimensional direction and sectional shapes of the object are successively picked up to produce its overall surface geometry.

Whichever of these types of apparatus are used, it is necessary to use a mechanical element that permits the sensing part to be moved over the same range as the object and this increases the overall size of the apparatus. In addition, the sensing part uses semiconductor devices in both the light-projecting zone (e.g. a semiconductor laser or an LED) and the light-receiving zone (e.g. PSD or CCD) and, hence, is vulnerable to heat and radiation and difficult to use in extreme environments.

SUMMARY OF THE INVENTION

An object, therefore, of the present invention is to provide a range finder which is partly composed of components that are made of materials capable of withstanding use in extreme environments and which is otherwise composed of semiconductor devices.

Another object of the invention is to provide an apparatus that uses the above-mentioned range finder to measure the surface geometries of objects.

Yet another object of the invention is to provide an apparatus capable of measuring the surface geometries of objects in extreme environments such as high temperature and high radiation.

These objects of the invention can be attained by a surface geometry measuring apparatus which relies upon triangulation to measure the distance to an object from a sensor head comprising projection optics and observation optics, characterized in that said projection optics has a drive mechanism capable of adjusting the laser beam projecting position or the baseline length, said distance to the object is calculated by measuring the baseline length at the time when the point at which a spot of the laser light projected to said object forms a focused image on the observation plane in the observation optics has come to the center of said observation plane, said surface geometry measuring apparatus has a mechanism for causing said sensor head or observation optics to move or turn from side to side and a mechanism for causing said sensor head to turn up and down such that said moving or turning from side to side and said turning up and down allow the point of measurement on said object to be scanned with the laser beam two-dimensionally to measure the surface geometry of said object.

The projection optics which is one of the two components of the sensor head has a projection laser head and a prism or a mirror for changing the optical path of the laser beam, with the baseline length being defined by the distance from the laser head to the position of light projection from the prism or mirror. The baseline length is adjusted by linear movement of the prism or mirror on the sensor head. The observation optics which is the other component of the sensor head has a condenser lens and the laser beam projected from the laser head via the prism or mirror is reflected at the surface of the object to be incident on the condenser lens.

The sensor head in its entirety is moved from side to side by means of a motor and a direct-acting system; alternatively, the sensor head in its entirety or the observation optics which is part of it is caused to turn from side to side by means of a motor and a goniostage. On the other hand, the sensor head in its entirety is caused to turn up and down by means of a motor and a goniostage. As a result, the surface of the object is scanned with the laser beam two-dimensionally to measure its surface geometry. The projection optics and the observation optics are individually connected to the controlling and analyzing device via optical fibers.

The present invention also provides a baseline length variable range finder using triangulation to determine the distance from a sensor head in observation optics to an object, characterized in that a drive mechanism for adjusting the baseline length or the position from which projection optics projects light is provided and the baseline length for the case when the point at which a spot of the laser light projected from said position to the object forms a focused image on an observation plane has come to the center of the observation plane is determined to calculate the distance to the object.

In the range finder of the invention, the sensor head portion is solely composed of optical, mechanical and electrical parts that are made of quartz, SUS and other materials which will experience limited deterioration in extreme environments. The controlling and analyzing portion which must use semiconductor devices such as IC chips is isolated over distance from the sensor head so that it can be installed in ordinary and non-extreme environments.

In the range finder of the invention, the components of the sensor head and the cables and optical fibers for connecting them to the analyzing device are replaced with equivalents that have high resistance to extreme environments. The range finder of the present invention has the additional advantage of suppressing the errors of measurement and the increase in measurement times that would otherwise result from such replacement.

DETAILED DESCRIPTION OF THE INVENTION

Figure 1:
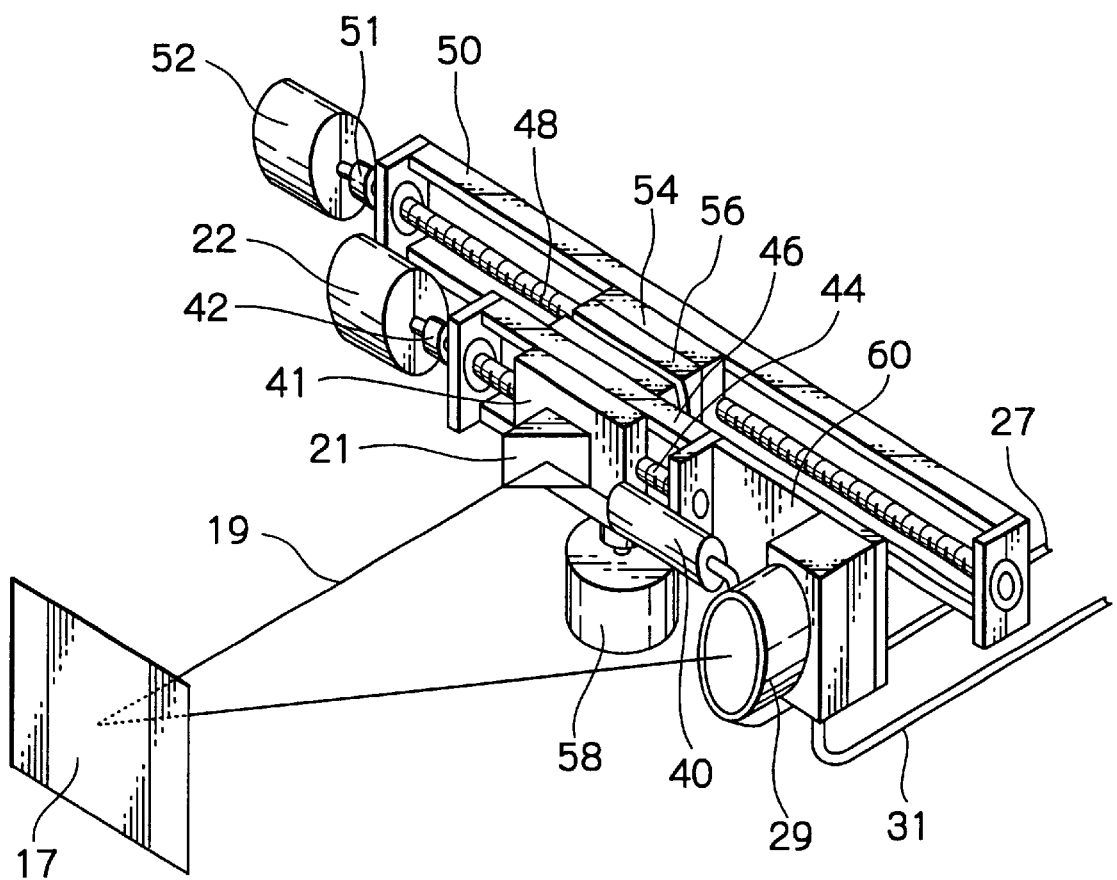
FIG. 1 is a perspective view showing the layout of an example of the sensor head in the surface geometry measuring apparatus of the invention.
Figure 2:
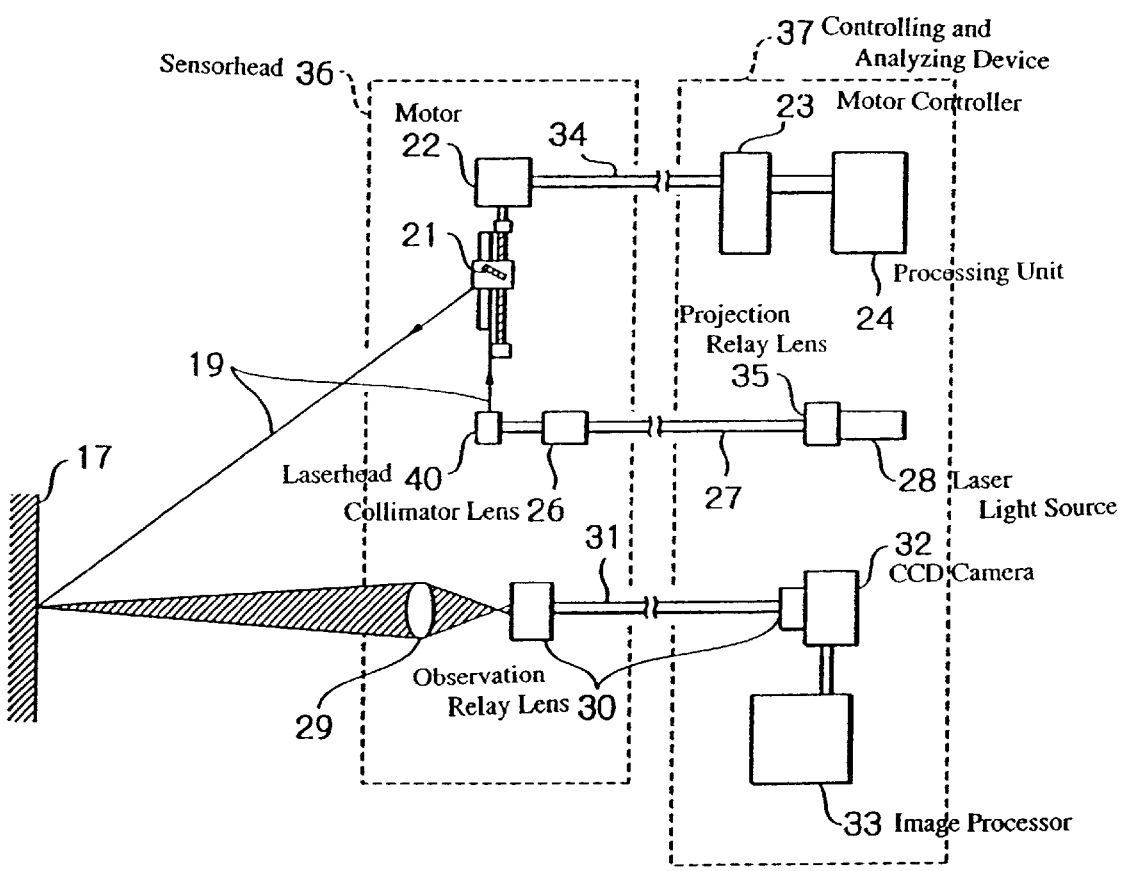
FIG. 2 shows schematically the surface geometry measuring apparatus of the invention which consists of a sensor head and a controlling and analyzing device.

We now describe the preferred embodiments of the invention with reference to the accompanying drawings. FIG. 1 is a perspective view showing the layout of an example of the sensor head in the surface geometry measuring apparatus of the invention. FIG. 2 shows schematically the surface geometry measuring apparatus of the invention which consists of a sensor head 36 and a controlling and analyzing device 37. A laser beam output from a laser light source 28 in the controlling and analyzing device 37 has its diameter reduced by passage through a projection optics relay lens 35 and transmitted to a projection optics optical fiber 27. The propagating laser beam passes through a collimator lens 26 so that it is collimated again into a laser beam having a diameter of about 1 mm. The collimated laser beam 19 issues from a laser head 40 to be incident on an optical path changing prism 21 (which may be a mirror) ahead of the sensor head 36 and changes its optical path. The outgoing laser beam is projected onto an object 17 at an angle.

In the observation optics, the laser beam undergoing random reflection from the object 17 passes through a condenser lens 29 to form a spot image of laser light. The spot image is relayed by an observation optics relay lens 30 to travel through an observation optics optical fiber 31 and is further relayed by another observation optics relay lens 30 to form a focused image on the imaging device in a CCD camera 32. The image captured with the CCD camera 32 is sent to an image memory device in an image processor 33 and subjected to the necessary arithmetic operations.

The prism 21 is fixed on a baseline length adjusting stage 41 which in turn is mounted on a ball screw 44. If the ball screw 44 is turned with a motor 22 via a coupling 42, the prism 21 moves from side to side along a linear guide 46. The distance from the laser head 40 to the position of light projection from the prism 21 defines the baseline length, which is adjusted by linear movement of 4 the prism 21. The motor 22 is controlled with a motor controller 23 fitted in the controlling and analyzing device 37.

Figure 3:
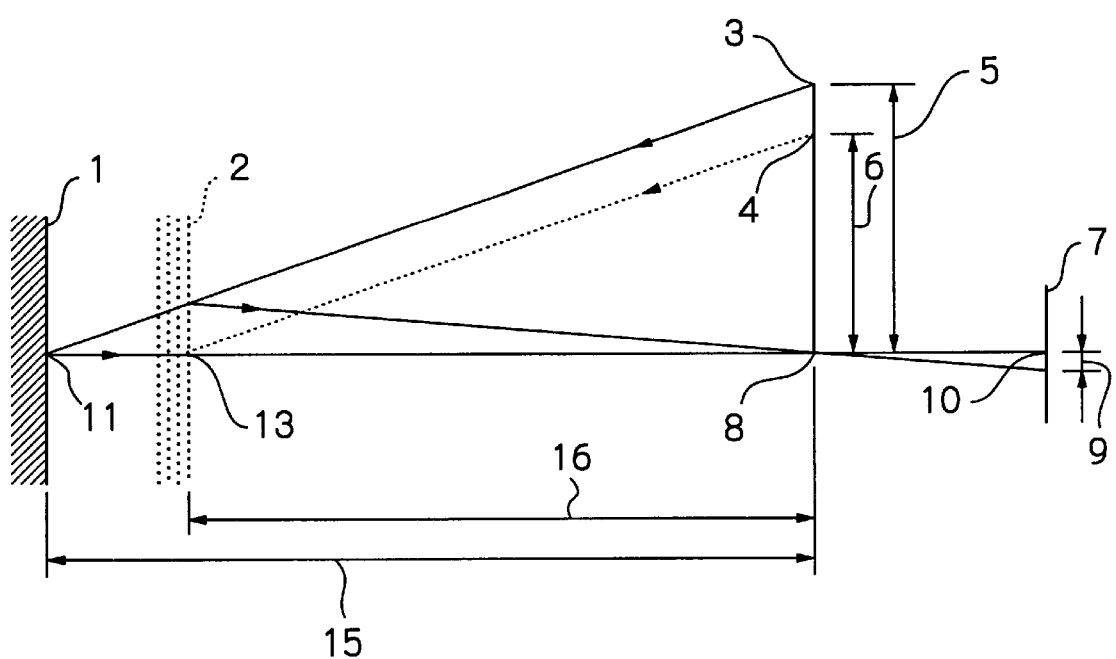
FIG. 3 shows schematically the principle of measurement of the distance from the sensor head to the object in the invention.

We now describe the principle of measurement of the distance from the point of light condensation in the sensor head, especially condenser lens 29, to the object 17. Referring to FIG. 3, consider a system for measuring the distance to a point of measurement a 1 on the object, with a point of measurement b 2 on the object being set as a reference point for which the distance from the point of light condensation 8 in the observation optics and the baseline length are both known. Suppose that laser light is projected to the point of measurement a 1. Also suppose that the position of light projection from the projection optics is moved by distance x from position b 4 to position a 3 by means of a linear drive system in order to form a focused spot image a 11 of the laser light at the center 10 of an observation plane 7. The triangle formed by a baseline b 6 and a spot image c 13 is similar to the triangle formed by a baseline a 5 and the spot image a 11. If the distance from the point of light condensation 8 to the point of measurement b 2 is written as l', the length of baseline b 6 as k, the distance to the point of measurement a 1 as 1, and the length of baseline a 5 when the spot image a 11 is focused at the center 10 of the observation plane is written as (k+x), the distance to be measured 1 is expressed by the following equation [1]:

$$l=(1+x/k)\cdot l' \quad [1]$$

Obviously, l and x have a linear relationship and one can calculate the distance of interest by triangulation in high precision at high speed.

Figure 4:
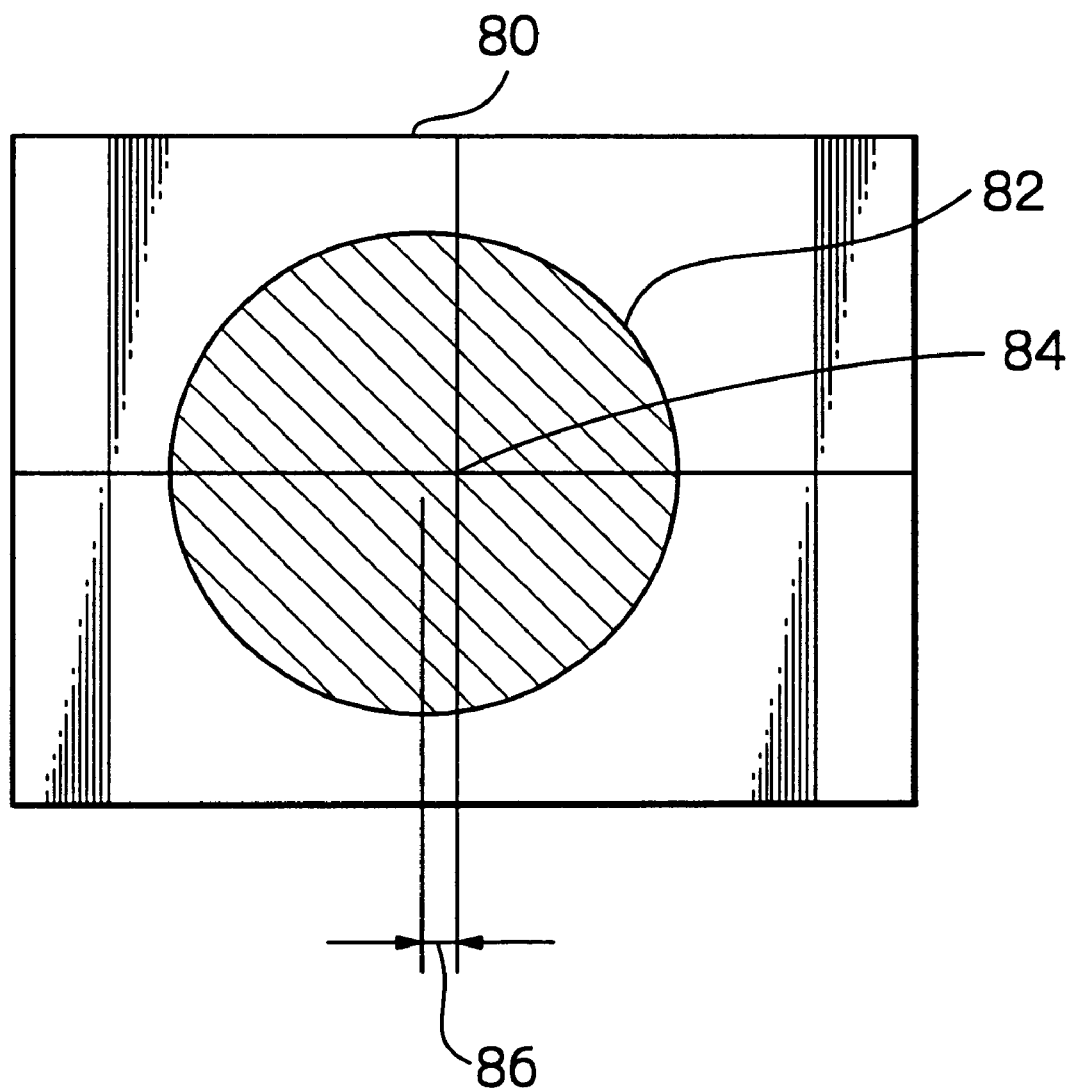
FIG. 4 is a schematic representation of a screen on which image processing is performed according to the invention.

The flow of the image processing and control to be performed in the invention is briefly described below with reference to FIG. 4. The laser beam projected onto the object 17 forms a focused spot image 82 almost round in shape on the image processing screen 80 of the image L processor 33. The coordinates of the center of gravity of this image are calculated to determine the offset 86 from the center 84 of the screen. From this offset 86, one can calculate the amount x by which the position of the prism 21 need be corrected in order to shift the center of gravity of the spot image 82 to the screen center 84.

Thus, the offset 86 of the spot image 82 is fed back to a processing unit 24 which controls the baseline length adjusting motor 22 and the position of the prism 21 is corrected such that the center of gravity of the spot image 82 will always be located at the center 84 of the screen. As a result, a feedback loop is formed between the observation optics and the projection optics including the prism 21.

By means of this feedback loop, the prism 21 keeps moving to follow every change in the distance to the point of measurement on the object 17 so that the center of gravity of the spot image 82 is always located at the center 84 of the screen. The movement x of the prism 21 as a departure from the baseline length is always known to the processing unit 24. Since l' and k in equation [1] are known, the distance l to the point of measurement can be determined from the value of x.

Turning back to FIG. 1, the projection optics which is an integral combination of the prism 21, baseline length adjusting stage 41, linear guide 46, ball screw 44, motor 22, laser head 40 and optical fiber 27 and the observation optics which includes the condenser lens 29 and the optical fiber 31 are both fixed on a base plate 60. On a goniostage 56 which is driven with a motor 58, the base plate 60 is mounted in such a way that it is capable of turning up and down. Hence, the projection optics and the observation optics are capable of simultaneously turning up and down about the line connecting the position of light projection from the prism 21 and the point of light condensation in the condenser lens 29. As a result, the laser beam traces an arcuate path from top to bottom and vice versa. The goniostage 56 is fixed to a lateral moving stage 54 which in turn is mounted on a ball screw 48. If the ball screw 48 is turned with a motor 52 via a coupling 51, the stage 54 moves linearly from side to side along a linear guide 50. Therefore, the goniostage 56 and, hence, the sensor head consisting of the projection optics and the observation optics can not only turn up and down but also move from side to side. As a result, the surface of the object 17 is scanned with the laser beam 19 two-dimensionally to provide a measurement of its surface geometry.

Figure 5:
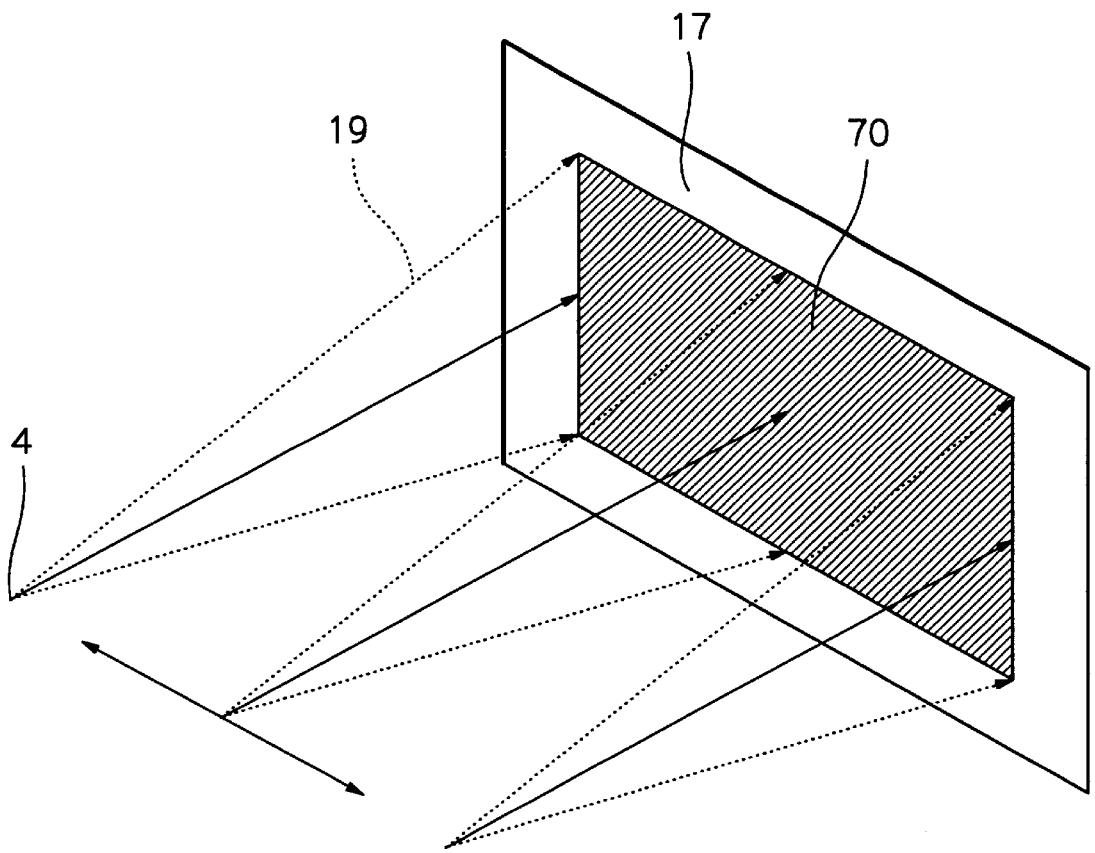
FIG. 5 shows schematically the paths traced by the scanning point on the object when the sensor head shown in FIG. 1 is used.

By referring to FIG. 5, we now describe the paths traced by the scanning point on the object 17. Projection of the laser beam 19 onto the object 17 starts at the top left corner of the scan area 70 and moves laterally to the top right corner. The subsequent paths traced by the scanning spot are the same as in interlaced scanning of a television image and it moves to and fro across the area 70, line by line, until the scanning ends at the bottom right corner. In FIG. 5, the solid lines with an arrowhead refer to the lateral movement of the scanning point and the dashed lines with an arrowhead refer to-the turning of the scanning point up and down.

Figure 6:
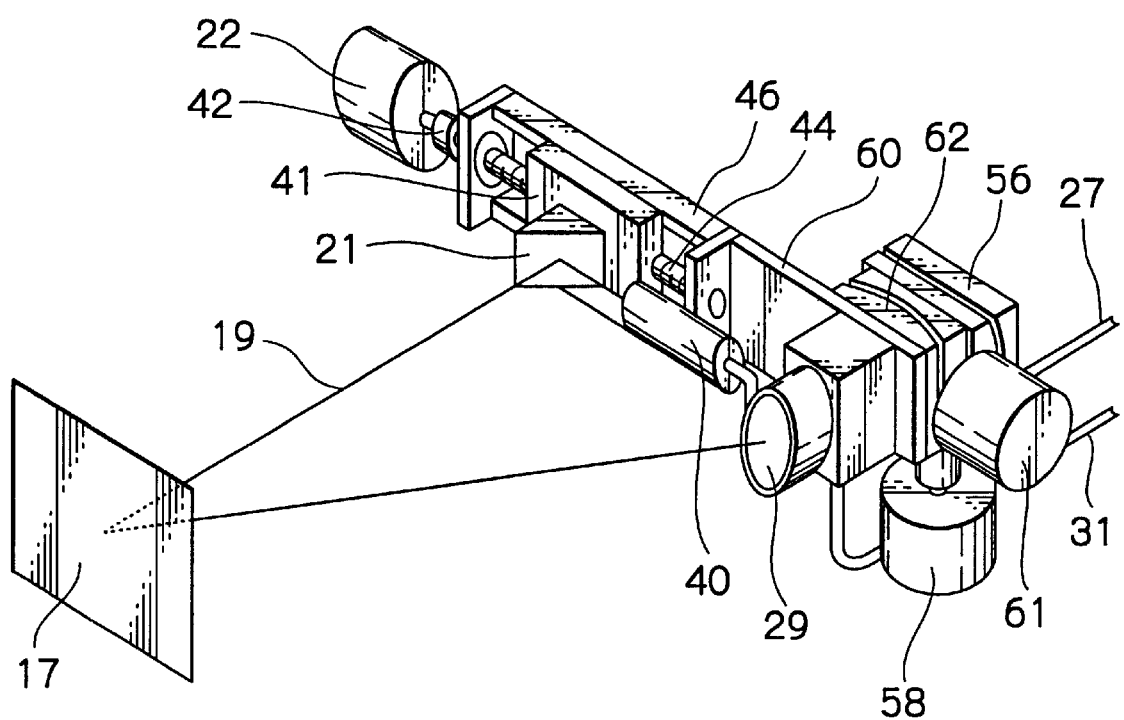
FIG. 6 is a perspective view showing the layout of another example of the sensor head in the apparatus of the invention.

FIG. 6 shows another example of the sensor head in the apparatus of the invention. It has two moving mechanisms, one for turning the sensor head from side to side about the axis intersecting the point of light condensing in the observation optics at right angles and the other for turning the sensor head up and down about the line connecting the position of light projection and the point of light condensing. By means of these two mechanisms, the sensor head scans the surface of the object 17 two-dimensionally with the laser beam 19.

Figure 7:
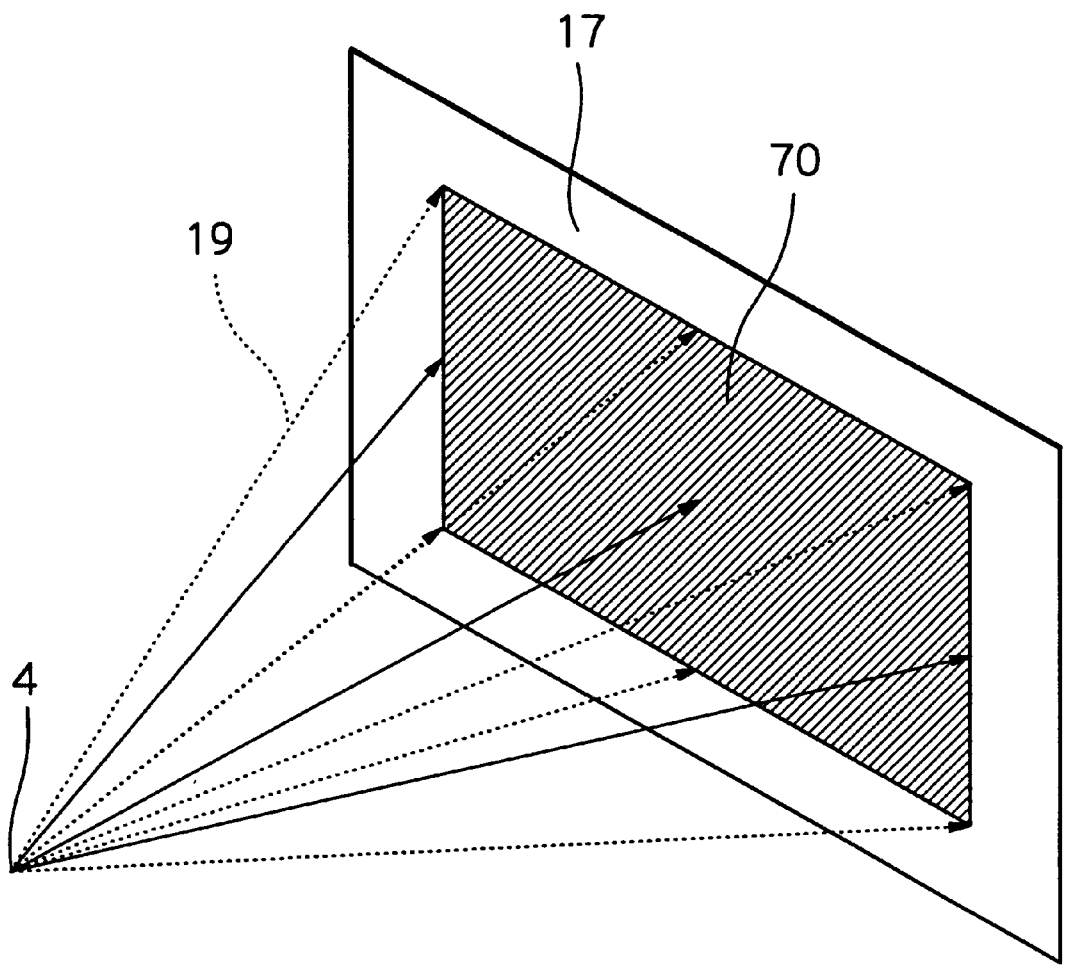
FIG. 7 shows schematically the paths traced by the scanning point on the object when the sensor head shown in FIG. 6 is used.

As with the sensor head shown in FIG. 1, the projection optics which is an integral combination of the prism 21, baseline length adjusting stage 41, linear guide 46, ball screw 44, motor 22, laser head 40 and optical fiber 27 and the observation optics which includes the condenser lens 29 and the optical fiber 31 are both fixed on a base plate 60. On a goniostage 62 which is driven with a motor 61, the base plate 60 is mounted in such a way that it is capable of turning from side to side. Hence, the sensor head is capable of turning from side to side about the axis intersecting the point of light condensing at right angles. As a result, the laser beam 19 moves from side to side. To the other goniostage 56 which is driven with a motor 58, the goniostage 62 is mounted such that it is capable of turning up and down. Hence, the sensor head can also turn up and down about the line connecting the position of light projection from the prism 21 and the point of light condensing in the condenser lens 29. As a result, the surface of the object 17 is scanned with the laser beam 19 two-dimensionally to provide a measurement of its surface geometry. The principle of measurement of the distance from the point of light condensing in the condenser lens 29 to the object 17 is the same as what has been described for the sensor head of FIG. 1 with reference to FIGS. 2–5. FIG. 7 shows the relationship between the position of light projection 4 and the paths traced by the scanning point on the object 17.

Figure 8:
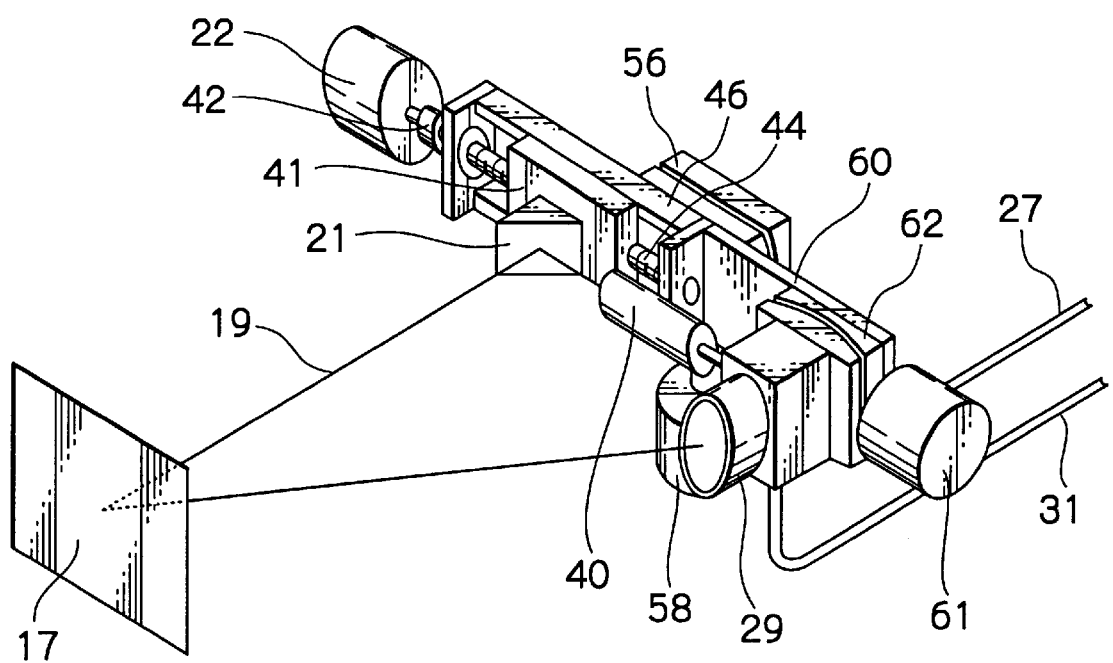
FIG. 8 is a perspective view showing the layout of yet another example of the sensor head in the apparatus of the invention.

Yet another example of the sensor head in the apparatus of the invention is shown in FIG. 8. It has two moving mechanisms, one for turning the observation optics from side to side about the axis intersecting the point of light condensing in it at right angles and the other for turning the sensor head up and down about the line connecting the position of light projection and the point of light condensing. By means of these two mechanisms, the sensor head scans the surface of the object 17 two-dimensionally with the laser beam 19.

As with the sensor head shown in FIG. 1, the projection optics which is an integral combination of the prism 21, baseline length adjusting stage 41, linear guide 46, ball screw 44, motor 22, laser head. 40 and optical fiber 27 and the observation optics which includes the condenser lens 29 and the optical fiber 31 are both fixed on a base plate 60. On a goniostage 56 which is driven with a motor 58, the base plate 60 is mounted in such a way that it is capable of turning up and down. Hence, the sensor head is capable of turning up and down about the line connecting the position of light projection from the prism 21 and the point of light condensing in the condenser lens 29. As a result, the laser beam 19 traces an arcuate path from top to bottom and vice. versa. To the other goniostage 62 which is driven with a motor 61, the condenser lens 29 is mounted such that it is capable of turning from side to side. Hence, the condenser lens 29 can turn from side to side about the axis intersecting the point of light condensing at right angles. As a result, the surface of the object 17 is scanned by the center of the visual field of the condenser lens 29 and by moving the laser beam 19 with the aid of the baseline length adjusting stage 41 and the baseline length adjusting motor 22 so that the spot of laser light will be located at the center of said visual field, the surface of the object 17 is scanned with the laser beam 19 two-dimensionally to provide a measurement of its surface geometry.

We now describe the principle of measurement of the distance from the point of light condensing in the condenser lens 29 to the object 17 by operating the sensor head of FIG. 8.

Figure 9:
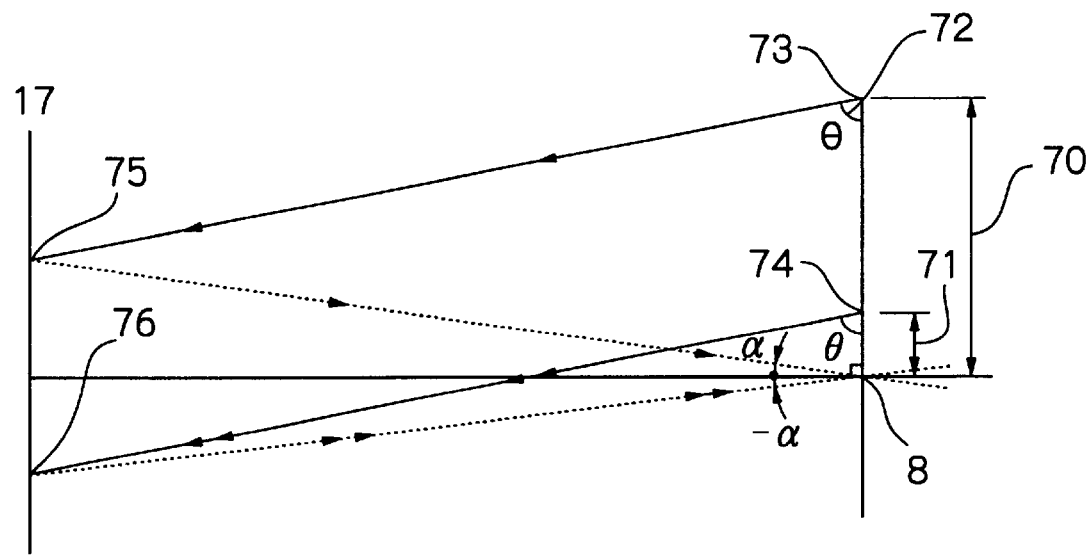
FIG. 9 shows schematically how the sensor head shown in FIG. 8 permits scanning over the surface of the object.

First, we refer to FIG. 9 to show that the surface of the object 17 can be scanned from side to side by causing only the condenser lens 29 to turn from side to side. Suppose that the condenser lens 29 turns through angles of ±α from the line normal to the surface of the object 17 so as to scan it within the visual field of the lens. Write c 70 and Lc for the baseline length and the distance from the position of light projection 73 of the laser beam to the point of reflection 75, respectively, for the case when the condenser lens 29 has turned by angle of +α so that the spot of light on the object 17 comes to the center 84 of the imaging plane (image processing screen 80 in FIG. 4); since the angle of light projection θ 72 is fixed, the rule of sines dictates:

$$Lc/\sin(90°-\alpha)=c/\sin(90°-\theta+\alpha);$$

$$\text{hence, } Lc/\cos\alpha=c/\cos(\alpha-\theta) \quad [2]$$

Similarly, write Ld and d 71 for the distance from the position of light projection 74 to the point of reflection 76 and the baseline length, respectively, for the case when the condenser lens 29 has turned by angle of −α; then, the following relationship holds:

$$Ld/\cos\alpha=d/\cos(\alpha-\theta) \quad [3]$$

In general terms, if the condenser lens 29 permits a scanning angle of α, the distance L from the position of light projection to the point of reflection for the case when the spot of light on the object 17 has come to the center 84 of the imaging plane can be related to the baseline length D by:

$$L=D\cdot\cos\alpha/\cos(\alpha-\theta) \quad [4]$$

This means that if α and θ are known, L is uniquely determined by D. In other words, the distance L from the position of light projection to the object 17 can be determined by adjusting the baseline length D.

Figure 10:
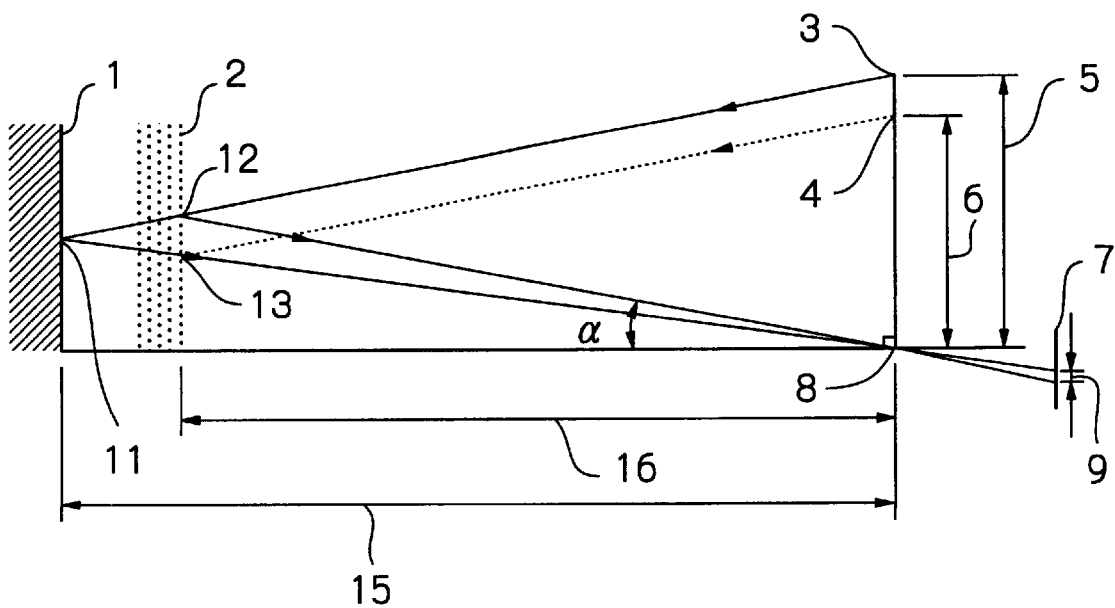
FIG. 10 shows schematically the principle of measurement of the distance from the sensor head shown in FIG. 8 to the object in the invention.

We next describe the principle of measurement of the distance from the point of light condensation in the condenser lens 29 to the object 17, again assuming that the lens 29 permits a scanning angle of α. Referring to FIG. 10, consider a system for measuring the distance to a point of measurement a 1 on the object, with a point of measurement b 2 on the object being set as a reference point for which the distance from the point of light condensation 8 and the baseline length are both known. As in FIG. 3, the triangle formed by a baseline b 6 and a spot image c 13 is similar to the triangle formed by a baseline a 5 and a spot image a 11. If the distance a 15 from the point of light condensation 8 to the point of measurement a 1 is written as l, the distance b 16 from the point of light condensation 8 to the point of measurement b 2 as l', the length of baseline b 6 as k, and the length of baseline a 5 as (k+x), the distance to be measured 1 is expressed by $l=(1+x/k) \cdot l'$ which is identical to equation [1]. Obviously, 1 and x have a linear relationship and one can calculate the distance of interest by triangulation in high precision at high speed.

From the foregoing description, one will readily understand that if the surface geometry measuring apparatus of the invention is adapted to include a means of representing measured distances in the controlling and analyzing device (indicated by 37 in FIG. 2), it can also be used as a range finding means. In the apparatus of the invention, the sensor head is isolated over distance from the controlling and analyzing device; if the sensor head is made of a heat- and radiation-resistant material and the controlling and analyzing device is made of materials including semiconductor devices, the sensor head can be installed in extreme environments such as high temperature and high radiation and used as robot vision or sensing eyes for robots that work in these extreme environments.

What is claimed is:

1. A surface geometry measuring apparatus which relies upon triangulation to measure the distance to an object from a sensor head comprising projection optics and observation optics, wherein said projection optics has a drive mechanism capable of adjusting the distance from the laser head to the laser beam projecting position or the baseline length, said distance to the object is calculated by measuring the baseline length at the time when the point at which a spot of the laser light projected to said object forms a focused image on the observation plane in the observation optics has come to the center of said observation plane, the angle of light projection of the laser beam to the object is constant, each element composing the observation optics in the sensor head is fixed to each other, and said surface geometry measuring apparatus has a mechanism for causing said sensor head or observation optics to move or turn from side to side and a mechanism for causing said sensor head to turn up and down such that said moving or turning from side to side and said turning up and down allow the point of measurement on said object to be scanned with the laser beam two-dimensionally to measure the surface geometry of said object.

2. The surface geometry measuring apparatus of claim 1, wherein said scanning mechanism comprises two sub-mechanisms, one for moving said sensor head linearly from side to side and the other for causing said sensor head to turn up and down about the line connecting said laser beam projecting position and the point of light condensing in said observation optics.

3. The surface geometry measuring apparatus of claim 1, wherein said scanning mechanism comprises two sub-mechanisms, one for causing said sensor head to turn from side to side about the axis intersecting the point of light condensing in said observation optics at right angles and the other for causing said sensor head to turn up and down about the line connecting said laser beam projecting position and said point of light condensing.

4. The surface geometry measuring apparatus of claim 1, wherein said scanning mechanism comprises two sub-mechanisms, one for causing said observation optics to turn from side to side about the axis intersecting the point of light condensing in said observation optics at right angles-and the other for causing said sensor head to turn up and down about the line connecting said laser beam projecting position and said point of light condensing.

5. The surface geometry measuring apparatus of claim 1, wherein said mechanism for moving said sensor head from side to side includes a motor and a direct-acting system and each of said mechanism for causing all or part of said sensor head to turn from side to side and said mechanism for causing said sensor head to turn up and down includes a motor and a goniometer.

6. The surface geometry measuring apparatus of claim 1, wherein said projection optics has a projection laser head and a prism or a mirror for changing the optical path of the laser beam and said observation optics has a condenser lens.

7. The surface geometry measuring apparatus of claim 1, wherein said projection optics and said observation optics are individually connected to the controlling and analyzing device via optical fibers.

8. A range finder that relies upon triangulation to measure the distance to an object from a sensor head comprising projection optics and observation optics, wherein said projection optics has a drive mechanism capable of adjusting the distance from the laser head to the laser beam projecting position or the baseline length, said distance to the object is calculated by measuring the baseline length at the time when the point at which a spot of the laser light projected to said object forms a focused image on the observation plane in the observation optics has come to the center of said observation plane, the angle of light projection of the laser beam to the object is constant, and each element composing the observation optics in the sensor head is fixed to each other.

9. The range finder according to claim 8, wherein a feedback loop is formed between the observation optics and the control system of the drive mechanism for adjusting the baseline length such that the point of formation of a focused image on the observation plane is always located at the center of the observation plane and a displacement of said point from the center of the observation plane is used as a feedback signal to the control system.

10. The range finder according to claim 9, wherein,
   the drive mechanism for adjusting the baseline length in the sensor head has a stepping motor, the control system has a motor controller, and the stepping motor and the motor controller are connected by a motor cable,
   the laser head in the sensor head is connected with a laser light source in the control system by a first optical fiber via a collimator lens and a projection relay lens,
   a condenser lens in the sensor head is connected with a CCD camera in the control system by a second optical fiber via observation relay lens, and
   the sensor head is isolated from the control system over distance by the motor cable and the optical fibers.

11. The range finder according to claim 10, wherein the components of the sensor head, the motor cable, the projection optics optical fiber and the observation optics optical fiber are made of a heat- and radiation-resistant material so that they can be used in extreme environments such as high temperature or high radiation.

* * * * *